United States Patent Office 3,528,934
Patented Sept. 15, 1970

3,528,934
PROCESS FOR THE PREPARATION OF MODIFIED GLYCIDYL ISOCYANURATE RESINS
Erwin Weinrich, Dusseldorf-Holthausen, Germany, assignor to Henkel & Cie, G.m.b.H., Dusseldorf-Holthausen, Germany, a corporation of Germany
No Drawing. Filed Nov. 16, 1967, Ser. No. 683,460
Claims priority, application Germany, Nov. 30, 1966,
H 61,145
Int. Cl. C07d 1/22; C08g 30/00
U.S. Cl. 260—18                              8 Claims

ABSTRACT OF THE DISCLOSURE

This invention relates to a process of preparation of soft, hardenable epoxide resins based on triglycidyl isocyanurate which, when hardened, retain the desired high temperature stability with a greater flexibility than hardened triglycidyl isocyanurate resins, as well as the soft, hardenable epoxide resins produced. This process is characterized by reacting a crystalline triglycidyl isocyanurate having an epoxide oxygen content of at least 14% with an epoxidized organic mono or dicarboxylic acid free of other epoxide reacting substituents, said epoxidized carboxylic acid being present in a ratio to provide from 1 to 10 carboxyl groups for each 30 epoxide groups of said crystalline triglycidyl isocyanurate in the mixture, and recovering a soft, hardenable epoxide resin.

THE PRIOR ART

It is well known to process crystalline triglycidyl isocyanurate by reaction with known hardeners for epoxide resins, for example, with organic polycarboxylic acid anhydrides or aromatic amines, to obtain molded bodies which are distinguished by good mechanical properties and excellent electrical and thermal properties. The use of crystalline triglycidyl isocyanurate in this process causes, however, difficulties due to its relatively high melting point and the consequent high processing temperatures required. Moreover, crystalline triglycidly isocyanurate is only difficultly soluble in most of the usual solvents, so that a processing from solutions, for example, for impregnation, becomes technically very expensive.

OBJECTS OF THE INVENTION

An object of the invention is to modify triglycidyl isocyanurate in such a manner that the resultant modified compound attains a low softening point and is easily soluble in solvents, without impairing any of the favorable properties of the hardened end products.

Another object of the invention is the development of a process for the preparation of a soft, hardenable epoxide resin based on triglycidyl isocyanurate which comprises the steps of reacting a crystalline triglycidyl isocyanurate having an epoxide oxygen content of at least 14% with an epoxidized organic acid free of other epoxide reacting substituents selected from the group consisting of epoxidized organic monocarboxylic acids and epoxidized organic dicarboxylic acids, said epoxidized organic acid being present in a ratio to provide from 1 to 10 carboxyl groups for each 30 epoxide groups of said crystalline triglycidyl isocyanurate in the mixture, at a temperature above the melting point of the ingredients for a time sufficient for the reaction product to attain a constant epoxide oxygen content, and recovering said soft, hardenable epoxide resin.

A further object of this invention is the obtention of a soft, hardenable epoxide resin based on triglycidyl isocyanurate.

A yet further object of the present invention is the obtention of a hardened epoxide resin having improved physical properties without a substantial reduction of thermal properties by the reaction of the above soft, hardenable epoxide resin based on triglycidyl isocyanurate, with an epoxide resin hardener.

These and other objects of the invention will become more apparent as the description thereof proceeds.

DESCRIPTION OF THE INVENTION

According to the invention, these objects are achieved in that crystalline triglycidyl isocyanurate having an epoxide oxygen content of at least 14% is reacted with epoxidized mono or dicarboxylic acids, allotting about 1 to 10, preferably 3 to 8 carboxyl groups to every 30 epoxide groups present in the triglycidyl isocyanurate.

The crystalline triglycidyl isocyanurate to be used according to the process of the invention should have an epoxide oxygen content of at least 14%. The preparation of such crystalline triglycidyl isocyanurate is known as such and described in U.S. Pat. No. 3,337,509, dated Aug. 22, 1967. This preparation can be accomplished by purifying the crude reaction products obtainable, for example, by reacting cyanuric acid with an excess of epichlorohydrin. Crystalline triglycidyl isocyanurate with the required epoxide oxygen content can be obtained by a single or by repeated recrystallization from suitable solvents such as methanol.

For the process of the invention, aliphatic or cycloaliphatic monocarboxylic acids and dicarboxylic acids can be utilized which contain at least one epoxide group. Such carboxylic acids may be straight-chained or branched. If an epoxidized aliphatic monocarboxylic acid is utilized, it should preferably contain about 10 to 22 carbon atoms. In the case that an epoxidized aliphatic dicarboxylic acid is utilized, long-chain carboxylic acids can be used as starting substances, for example, those having from about 30 to 40 carbon atoms.

The preparation of these epoxycarboxylic acids is well known as such and is effected, for example, epoxidizing carboxylic acids containing olefinic double bonds with per acids, such as performic acid, peracetic acid, perbenzoic acid and the like. As starting material for the preparation of the epoxidized acids, for example, the following olefinically unsaturated carboxylic acids can be utilized, alkenoic acids having 3 to 22 carbon atoms such as acrylic acid, crotonic acid, methacrylic acid, hexenoic acid, octenoic acid, nonylenic acid, $\beta$-$\gamma$-decylenic acid, undecylenic acid, oleic acid; alkadienoic and alkatrienoic acids having 12 to 22 carbon atoms such as linoleic acid, linolenic acid; alkendioic acids having from 3 to 22 carbon atoms such as fumaric acid; cycloalkenecarboxylic acids having 6 to 12 carbon atoms such as cyclohexenecarboxylic acid; cycloalkene dicarboxylic acids having 6 to 12 carbon atoms such as cyclopentenedicarboxylic acid, cyclohexenedicarboxylic acid, methylcyclohexenedicarboxylic acid; as well as olefinically unsaturated dimerized fatty acids derived from natural fats having from 30 to 40 carbon atoms, and other. The acids, previously mentioned, can be employed individually or as a mixture.

Preferably, according to the invention, the following epoxycarboxylic acids are employed: epoxyalkanoic acids having from 10 to 18 carbon atoms such as epoxidized oleic acid, epoxidized undecylenic acid; epoxidized dimerized olefinically-unsaturated fatty acids having from 30 to 40 carbon atoms in the molecule; and epoxycyclohexane carboxylic acid.

The reaction between the crystalline triglycidyl isocyanurate having an epoxide oxygen content of at least 14% and the carboxylic acids containing epoxy groups is conducted at a temperature above the melting point of the reactants and preferably ranging between 100° C. and 150° C. At these temperatures about ½ to 6 hours are required to accomplish the reaction in order to reach the end-point of a constant epoxide oxygen content of the reaction product.

The reaction, according to the invention, for the purpose of modifying the triglycidyl isocyanurate is, as a rule, conducted so that the epoxycarboxylic acid is introduced into the melted triglycidyl isocyanurate in small fractions. It is also possible to effect the reaction in the presence of organic solvents, whereby the epoxycarboxylic acid is added to the mixture consisting of triglycidyl isocyanurate and solvents while being stirred and heated. This process can be advantageous in the case when the modified glycidyl isocyanurate is to be further processed from a solution. The completion of the reaction can be realized by the fact that the epoxide oxygen content of the reaction product remains practically constant.

The glycidyl isocyanurate, modified according to the invention, is in a soft form at room temperature, and in this condition it will remain stable for longer than one year. Should, by any chance, crystallization phenomena appear, these can easily be eliminated by heating the product for a short period of time. At temperatures between 50° C. and 70° C., easily pourable mixtures can be prepared from the modified glycidyl isocyanurate together with the usual epoxide resin hardening agents as, for example, organic polycarboxylic acid anhydrides.

The modified glycidyl isocyanurates of the invention have an epoxide equivalent of about 107 to 200, corresponding with an epoxide oxygen content of about 15% to 8.0%, depending on the type and amount of epoxycarboxylic acid employed. Since by means of the use of epoxidized carboxylic acids during the reaction with the triglycidyl isocyanurate about one epoxide group is introduced into the molecule for each reacted glycidyl group, the content of epoxide oxygen of the modified glycidyl isocyanurate is less markedly reduced than would be the case if the corresponding non-epoxidized carboxylic acids were used.

The modified glycidyl isocyanurates of the invention are easily soluble in organic solvents, such as acetone, butanone, cyclohexanone, methylcyclohexanone, dioxane, tetrahydrofuran, benzyl alcohol, toluene, xylene, ethyl acetate, butyl acetate, amyl acetate, dimethylsulfoxide, chloroform and methylenechloride. As a rule, solutions with a content of about 25% to 60% of the modified glycidyl isocyanurate can be prepared at room temperature.

The further processing of the soft, hardenable, modified glycidyl isocyanurate epoxide resins of the invention can be accomplished with the usual polyadduct formers or catalysts, known as such hardeners for epoxide compounds or triglycidyl isocyanurate. (As is well known, in contrast to the "polyadduct formers," "catalysts" are generally understood to be such compounds which are added to the epoxide compound to be hardened only in relatively small quantities. However, this distinction is not always strictly observed.)

The hardening of the reaction mixture of modified glycidyl isocyanurate and the epoxide resin hardeners is effected in the usual manner at temperatures from 60° C. to 200° C., particularly at from 80° C. to 180° C. over a period of from about 1 to 20 hours, particularly from 2 to 8 hours. In most cases the reaction is complete after this period of time. However, to obtain optimal values of the hardened resin, it is advisable to temper the molded bodies for an additional time at elevated temperatures of from 120° C. to 210° C.

For example, anhydrides of organic polycarboxylic acids can be employed as polyadduct formers. For this purpose, for example, the anhydrides of hydrocarbon di- and polycarboxylic acids are considered, such as hexahydrophthalic acid anhydride, tetrahydrophthalic acid anhydride, phthalic acid anhydride, naphthylene-dicarboxylic acid anhydride, methylcyclohexane-dicarboxylic acid anhydride, dodecenylsuccinic acid anhydride, pyromellitic acid anhydride, endomethylenetetrahydrophthalic acid anhydride, methylendomethylenetetrahydrophthalic acid anhydride, dichloromaleic acid anhydride, hexachloroendomethylenetetrahydrophthalic acid anhydride, dibromo- and tetrabromophthalic acid anhydride and others.

As a rule, the amount of the organic polycarboxylic acid anhydride epoxide resin hardener to be used is measured so that from 0.6 to 1.2, preferably 0.8 to 0.9, carboxylic acid anhydride groups are present for each epoxide group in the molecule of the modified glycidyl isocyanurate.

Moreover, basic epoxide resin hardeners, such as organic nitrogen compounds which contain at least two active hydrogen atoms in the molecule attached to nitrogen, can be utilized as polyadduct formers. For example, primary or secondary amines can be utilized which may be of aliphatic as well as cycloaliphatic structure. The cyclic amines may contain cycloaliphatic, aromatic and/or heterocyclic rings. Furthermore, those amines can be utilized which contain several of the previously mentioned rings. In the heterocyclic amines, the amino nitrogen can also be a constituent of the ring. With regard to the compounds indicated, the active hydrogen atoms can be attached to one or several nitrogen atoms. Examples of the mentioned primary and secondary amines are alkylamines such as ethylamine, propylamine, hexylamine, dodecylamine; phenylalkylamines such as benzylamine; alkanediamines such as ethylenediamine, propylenediamine, butylenediamine, dimethylaminopropylamine, diethylaminopropylamine; alkanepolyamines such as diethylenetriamine, triethylenetetramine; cycloalkanediamines such as 1,2- or 1,4-diaminocyclohexane, 1,2-diamino-4-ethylcyclohexane, 1-cyclohexyl - 3,4 - diaminocyclohexane; aniline; o,m,p-phenylenediamine; benzidine; 4,4'-diaminodiphenylmethane. Also useful are condensates of aniline with formaldehyde.

For the hardening reaction of the invention, also those amines can be employed which contain additional functional groups, for example, alkanolamines such as ethanolamine, propanolamine, N - (hydroxyethyl) - 1,2 - diaminopropane, N-(hydroxypropyl)-m-phenylenediamine; 4,4'-diaminodiphenylsulfide; 4,4'-diaminodiphenylsulfone; dicyanodiamide; dicyanoethylethylenediamine; 1,4-bis-(γ-aminopropoxymethyl) - cyclohexane; chlorinated benzidine; 4,4'-diamino-3,3'-dichlorodiphenylmethane; 4,4'-diamino - 3,3' - dimethoxydiphenylmethane; 4,4'-diaminodiphenyloxide; etc.

Favorable results in the hardening reaction can also be obtained with acid amides containing free amino groups which are prepared by the reaction of polyamines, such as ethylenediamine, diethylenetriamine and triethylene tetramine, with polymerized fatty acids.

In general, the amount of the epoxide resin amine hardener to be used is measured so that from 0.6 to 1.2, preferably 0.8 to 1.0, reactive amino hydrogens are allotted to each epoxide group in the molecule of the modified glycidyl isocyanurate.

A compilation of compounds suitable as polyadduct formers or epoxide resin hardeners is presented in the book by A. M. Paquin, "Epoxidverbindungen und Epoxydharze," published in 1960 by Springer Verlag, in the chapter concerning "Härtung in der Praxis." Of course, this reference is not intended to imply that only those hardening agents mentioned in the book are useful.

Fundamentally, as catalysts for the hardening of the modified glycidyl isocyanurate, all of the Lewis-acids are suitable, alone or in the form of their complexes. Primarily as Lewis-acid is to be considered borontrifluoride as well as its complexes with monoethanolamine, piperidine, trimethylamine, hexamethylenetetramine, urea, pyridine, or also water, ethyleneglycol, glycerine, benzyl alcohol, triethylamine, dimethylbenzylamine, dilaurylamine, vinylpyrrolidone, caprolactam and others. Furthermore, tin tetrachloride, titanium tetrachloride, antimony pentachloride and the like can be used as Lewis-acids.

An additional significant group of suitable catalysts for the hardening of the modified glycidyl isocyanurate of the invention is represented by the phosphines and tertiary amines, such as, for example, triphenylphosphine, tetraphenylphosphonium chloride, diisopropylamine, N,N-dimethylaniline, 2,4,6 - tris - (dimethylaminomethyl)-phenol, triethanolamine borate, tetramethylammonium chloride, benzyltrimethylammonium hydroxide and chloride, N-alkylpyridinium salts, etc.

Also catalytically effective are alcoholates, such as aluminum triisopropylate, aluminum tributylate, aluminum, cobalt, copper or nickel compounds of ethylacetoacetate or of acetylacetone. Also suitable is butyl titanate.

For further processing, dyes, fillers or fibrous materials may be added in the usual manner to the modified glycidyl isocyanurate of the invention before hardening, such as quartz powder, glass powder, asbestos fibers, mica, aluminum oxide, titanium oxide, zirconium oxide, ground dolomite and barium sulfate.

If the modified glycidyl isocyanurate, according to the invention, is to be worked up into cast resins, preferably organic dicarboxylic acid anhydrides are used as the epoxide resin hardening agents. In comparison with the unmodified powdery triglycidyl isocyanurate, the thus obtainable casting mixtures can be processed at a temperature of 60° C., and at this temperature they will retain a low viscosity for an extended period of time. It is of particular advantage that the molded bodies thus prepared exhibit improved mechanical properties at constant electrical values and with a hardly noticeable drop in their Martens temperatures as compared with a similar casting mixture based on triglycidyl isocyanurate.

Furthermore, the modified glycidyl isocyanurate, together with suitable epoxide resin polyadduct formers or hardening catalysts, can be utilized for the preparation of laminated materials, molding compositions, adhesive bonds, coating, or, if so desired, together with organic solvents as putty or fillers. In a general sense, all of those fields of application are considered for the modified glycidyl isocyanurate of the invention in which epoxide resins have already been employed.

The following specific embodiments are illustrative of the practice of the invention. They are not, however, to be deemed limitative in any manner.

EXAMPLES 1 TO 6

150 g. of crystalline triglycidyl isocyanurate (a mixture of high and low melting form; epoxide oxygen content=15.5%) were heated to about 125° C. in a 500 cc. three-neck flask equipped with a stirrer and a thermometer. Then, within the space of one hour, various amounts of the epoxycarboxylic acids given in Table I were added thereto. After this addition, the reaction was completed at elevated temperatures as specified in Table I, while the mixture was stirred, until a constant epoxide value had been attained.

In Table I, the first column indicates the number of the examples in chronological order; the following columns indicate the added epoxycarboxylic acid in gm. of acid/150 gm. of triglycidyl isocyanurate (TGI), the molar ratio of triglycidyl isocyanurate to the carboxylic groups employed, the reaction conditions for the completion of the reaction, the epoxide value and the epoxide equivalent as well as the solubility in acetone at a temperature of 20° C. of the resultant product.

TABLE I

| Example | Acid in gms./150 gms. TGI | Molar ratio | Reaction conditions | Percent epoxide oxygen | Epoxide equivalent | Solubility in acetone (20° C.), percent |
| --- | --- | --- | --- | --- | --- | --- |
| 1 | 15 epoxidized oleic acid | 10:1 | 3 hours 120–130° C. | 116 | 116 | 35 |
| 2 | 59.6 epoxidized oleic acid | 10:4 | do | 9.8 | 164 | 35 |
| 3 | 15 epoxidized undecylenic acid | 10:1.5 | do | 14.8 | 108 | 37 |
| 4 | 30 epoxidized undecylenic acid | 10:3 | do | 12.6 | 127 | 40 |
| 5 | 45 epoxidized dimeric fatty acid | 10:3 | do | 12.1 | 132 | 35 |
| 6 | 42.6 epoxidized cyclohexene carboxylic acid. | 10:6 | do | 13.2 | 121 | 35 |

Hardening of the modified glycidyl isocyanurate resins

For the production of molded bodies from the modified glycidyl isocyanurate resins, mixtures were prepared with hexahydrophthalic acid anhydride (HHPA), allowing about 0.9 acid anhydride groups for each epoxide group in the molecule. At temperatures ranging between 80° and 100° C. molded resin bodies, measuring 10 x 15 x 120 mm. were cast from these mixtures and gelatinized at a temperature of 90° C. Thereafter, the molded bodies were hardened for 3 hours at 160° C. and then tempered for 20 hours at 200° C.

In Table II, the first column indicates the number of the respective example, according to which the modified glycidyl isocyanurate resin was prepared. The next columns indicate the amount of the hexahydrophthalic acid anhydride (HHPA) utilized, based on 100 gm. of the modified glycidyl isocyanurate resin. The following columns indicate the resistance to deformation by heat (DIN 54,458), the impact strength (DIN 53,453), the deflection and flexural strength (DIN 53,452). The surface leakage of current amounted in all cases to ka. 3 c. (DIN 53,480).

TABLE II

| Example | HHPA, grams | Martens Temp., °C. | Impact strength, kp. cm./cm.$^2$ | Deflection, mm. | Flexural strength, kp./cm.$^2$ |
| --- | --- | --- | --- | --- | --- |
| 1 | 120 | 165 | 15 | 7 | 750 |
| 2 | 86 | 118 | 15 | 8 | 880 |
| 3 | 130 | 213 | 15 | 7 | 940 |
| 4 | 108 | 205 | 18 | 8 | 950 |
| 5 | 106 | 166 | 17 | 6 | 1,070 |
| 6 | 116 | 198 | 22 | 8 | 1,220 |

The preceding specific embodiments are illustrative of the process of the invention. It is to be understood, however, that other expedients known to those skilled in the art can be employed without departing from the spirit of the invention or the scope of the appended claims.

I claim:

1. A process for the preparation of a soft epoxide resin based on triglycidyl isocyanurate which consists esentially of the steps of reacting a crystalline triglycidyl isocyanurate aving an epoxide oxygen content of at least 14% with an epoxidized organic carboxylic acid free of other epoxide reacting substituents selected from the group consisting of epoxidized aliphatic organic monocarboxylic acids having from about 10 to 22 carbon atoms, epoxidized dimerized olefinically-unsaturated fatty acids having from 30 to 40 carbon atoms and epoxidized cycloalkene carboxylic acids having from 6 to 12 carbon atoms, said epoxidized organic carboxylic acid being present in a ratio to provide from 1 to 10 carboxyl groups for each 30 epoxide groups of said crystalline triglycidyl isocyanurate in the mixture, at a temperature above the melting point of the ingredients for a time sufficient for the reaction product to attain a constant epoxide oxygen content, and recovering said soft epoxide resin which is hardenable with epoxide resin hardeners.

2. The process of claim 1 wherein said epoxidized organic carboxylic acid is present in a ratio to provide from 3 to 8 carboxyl groups for each 30 epoxide groups of said crystalline triglycidyl isocyanurate.

3. The process of claim 1 wherein said reaction is conducted at a temperature between 100° C. and 150° C.

4. The process of claim 1 wherein said epoxidized organic carboxylic acid is an epoxyalkanoic acid having from 10 to 18 carbon atoms.

5. The process of claim 1 wherein said epoxidized organic carboxylic acid is an epoxidized, dimerized, olefinically unsaturated fatty acid having from 30 to 40 carbon atoms.

6. The process of claim 1 wherein said epoxidized organic carboxylic acid is epoxycyclohexane carboxylic acid.

7. The soft epoxide resin based on triglycidyl isocyanurate produced by the process of claim 1.

8. A stable epoxide resin composition which comprises the product produced by the process of claim 1, in combination with an epoxide resin hardener, said composition being stable at temperatures up to 60° C. and hardenable at temperatures from 60° C. to 200° C.

References Cited
UNITED STATES PATENTS 3,002,950  10/1961  Shull _____ 260—348 X DONALD E. CZAJA, Primary Examiner C. W. IVY, Assistant Examiner U.S. Cl. X.R.

260—2, 830, 77.5, 78.4, 348